Jan. 11, 1949.  R. J. IMBERT ET AL  2,458,600
AERODYNAMIC PROPELLING MEANS OPERATING THROUGH
DIRECT REACTION JET AND SCAVENGING
Filed Aug. 27, 1945
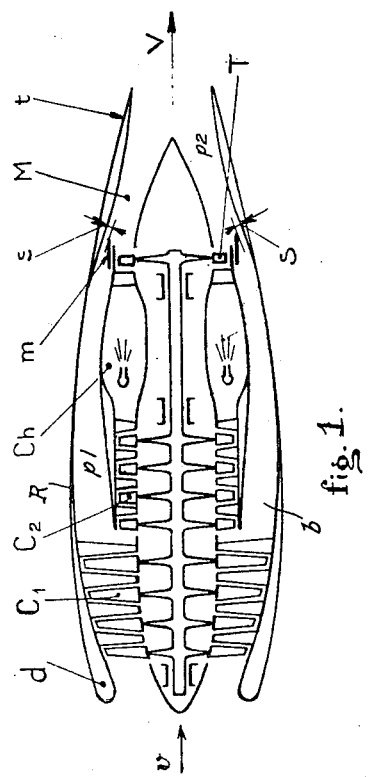
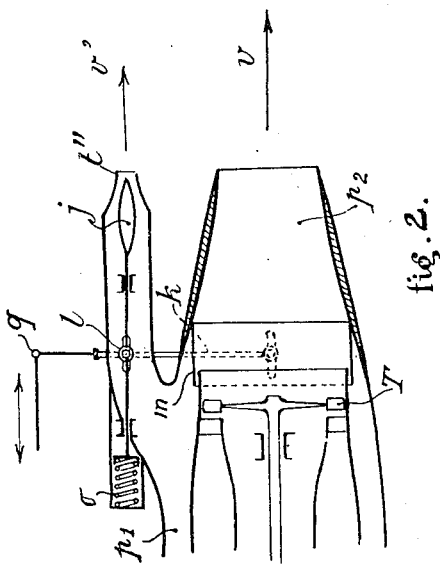
INVENTOR
R. J. Imbert + M. H. L. Sédille
By Watson, Cole, Grindle + Watson Patented Jan. 11, 1949

2,458,600

UNITED STATES PATENT OFFICE 2,458,600

AERODYNAMIC PROPELLING MEANS OPERATING THROUGH DIRECT REACTION JET AND SCAVENGING

Roger Jean Imbert and Marcel Henri Louis Sédille, Paris, France, assignors to Societe Rateau (Societe Anonyme), Paris, France, a company of France, and Rene Anxionnaz, Paris, France Application August 27, 1945, Serial No. 612,867
In France January 26, 1942

Section 1, Public Law 690, August 8, 1946
Patent expires January 26, 1962

5 Claims. (Cl. 60—35.6)

It is a well known fact that in the case of aircraft moving at very high speeds airscrew propulsion has no longer a sufficient efficiency. For such speeds it is highly interesting to use direct reaction jet propulsion in association with the use of gas turbines as driving systems.

Propelling means of this type have already been described in the U. S. Patent No. 2,376,911. In certain of these apparatuses a part of the air delivered by the low pressure portion of the compressor is led directly i. e. without passing through the combustion chamber and the gas turbine into the inlet of the reaction nozzle inside which said air is admixed with the exhaust gases passing out of the turbine so as to produce a scavenging action in the said nozzle.

The present invention has for its object improvements in this particular type of reaction jet propelling means. According to the invention, the low pressure portion of the compressor is adapted for use in the case of reduced speed flight or of operation on a stationary support and the proper operation of this portion of the compressor is retained for used at high speed flight by means of a suitable valve arrangement inserted in the circuit of the scavenging air, said valve system being controlled either automatically under the control of the speed of progress of the aircraft or else at will by the pilot.

The following description given by way of a non limiting example together with the corresponding accompanying drawings will allow the manner of executing the invention to be well understood.

Figure 1 shows diagrammatically in axial cross section a form of execution of a reaction jet propeller according to the invention.

Fig. 2 is a partial view of a modification.

A reaction jet propeller comprises generally an air compressor, a gas turbine adapted to drive said compressor and an intermediary combustion chamber inside of which a suitably chosen fuel is burnt with a view to producing high temperature gases adapted to drive the turbine.

The balance of power inside the turbo-compressor is such that the expansion of the gases is not wholly used inside the turbine. The remainder of the energy is used in the reaction nozzle and produces directly the propulsion power under the form of a gas exhaust speed V which is higher than the speed of progress of the aircraft.

The whole arrangement is housed inside a fairing the direction of which lies along the relative wind while the front part to the front of the compressor forms a diffuser producing a self compression of air through a reduction of its speed.

For aircraft speeds $v$ of the magnitude of 900 to 1000 kilometers per hour, the speed V is much higher than the speed $v$ whereby the efficiency of propulsion remains still comparatively low. It would improve with an aircraft speed $v$ substantially higher. For the range of speeds considered, it has already been proposed in the so-called jet propellers with scavenging, to increase the efficiency in the propulsion by increasing the mass of gases to be exhausted and by reducing their speed, which is obtained in practice by removing air from the compressor, at a pressure equal to that prevailing at the outlet from the turbine and by admixing said scavenging air with the exhaust gases from the turbine before they pass through the reaction nozzle. The corresponding arrangements are shown diagrammatically in Fig. 1 wherein the low pressure part of the compressor is shown at $C_1$. At the outlet from this compressor part comprising a certain number of wheels, the air is subdivided into two parts of which one passes directly through the ducts $b$ into the mixing chamber M arranged at the outlet of the turbine T, while the remainder after it has been compressed by the high pressure part $C_2$ of the compressor passes through the combustion chamber Ch and feeds the nozzle of the turbine T. At the outlet from the latter, the mixture of the two fluxes is performed in a chamber M and the whole then expands in the reaction nozzle $t$.

In such an arrangement calculated for instance for an aircraft speed $v$ of the order of 250 meters per second, the pressure $p_1$ at the outlet of the compressor $c_1$ is equal to the pressure $p_2$ prevailing at the outlet of the turbine T whereby so-called adaptation conditions are obtained. The pressure $p_1=p_2$ corresponds to the sum of the compression produced in the diffuser $d$ at the front nose of the fairing R which compression causes the speed of the air to pass from the speed $v$ which is 250 meters per second down to the speed of passage $v'$ through the compressor wheels which is of the order of about 100 meters per second, and of the compression produced by the wheels of the part $C_1$ of the compressor. As will be shown, such an arrangement is liable to work in a defective manner when the aircraft speed $v$ is lower than the speed corresponding to adaptation conditions and which is 250 meters per second in the example chosen and in particular its operation is defective in case of working on a stationary support.

This last manner of working will be discussed, for which the speed $v$ is zero, the other cases corresponding to a speed $v$ lower than the normal speed of operation under adaptation conditions forming thus intermediary cases.

For operating on a stationary support, the self compression due to the speed of progression of the aircraft is lacking and is furthermore replaced by an expansion, as the speed $v'$ is to be obtained through expansion of the air under rest conditions. Consequently, whereas, at normal adaptation speed $v$, the expansion in the nozzle $t$ corresponds to the sum of the self compression in the diffusor $d$, and of the compression performed by $C_1$ in operation at reduced speed or on a stationary support, said expansion corresponds now only to a value lower than the compression of $C_1$. Thus in the absence of any particular contrivance the pressure $P_1$ is lower than the pressure $P_2$ and the gases would flow back towards the compressor $C_1$ which result would be against the object sought for. The present invention has for its object to remove this drawback.

To this end, in accordance with one of the features of the invention, the balance between the pressures $p_2$ and $p_1$ is obtained for operation on a stationary support. The part $C_1$ of the compressor is made more considerable as in the ordinary construction of this type of jet propeller. During flight at high speed, the pressure produced by the part $C_1$ added to the self-compression of the air in the diffusor $d$ being then too considerable, this would lead to a compensation and balance by reason of the tendency of the compressor $C_1$ to operate then with an increased output and at a lower pressure. Consequently this portion of the compressor would operate under bad adaptation conditions and with increased losses. According to the present invention, the suitable adaptation of this portion of the compressor to the desired conditions, is maintained by means of a valve system increasing the resistance in the scavenging air circuit $b$ at high speed. As shown in Fig. 1, this valve system is provided in a particularly simple manner by means of a sliding cylinder $m$. The outer wall of the air leading means having at this point a conical shape, any displacement of the sliding cylinder $m$ will produce a variation in the cross-sectional passage area S for the scavenging air flux. The displacement of the cylinder $m$ may be controlled by any suitable means either at will by the pilot or in an automatic manner.

The extremely considerable interest of a valve system designed in conformity with the present invention results in that the speed produced by the expansion of the air through the cross section S is not lost, but that by reason of the suitable direction thus given to the flow of air moving in the same direction as the fluid passing out of the turbine T, there is a recovery of said speed in the reaction nozzle $t$. This energy takes therefore an active part in the propulsion of the aircraft. From a constructional standpoint, the valve system $m$ being located in a part through which comparatively cold air circulates, its execution and its control means meet with no special difficulty.

Instead of providing for balance in operation on a stationary support, it is also possible to provide for such a balance at an intermediary aircraft speed designated by $v_1$. This leads to the above mentioned drawback for the speeds comprised between 0 and $v_1$. To avoid this, it is possible to proceed as follows:

For speeds $v$ above $v_1$ and decreasing down to $v_1$, it is necessary to gradually open the sliding cylinder $m$ so as to increase the cross-sectional passage area S allowed for the flux of scavenging air, whereby the difference between the pressure $p_1$ in the scavenging circuit and the pressures $p_2$ streamdownwards with reference to the turbine decreases gradually and becomes zero for the aircraft advancing at the speed $v_1$. At this moment, and in order to avoid the return of the burnt gases, the sliding valve system $m$ is closed entirely. If no other care were taken, the compressor would then operate under unfavorable conditions. To avoid this, it is possible then as illustrated in Fig. 2 to uncover the entrance into a special jet reaction nozzle $t''$, the opening of which may be adjusted for instance by a suitably outlined body $j$ so as to continue keeping the opening of the compressor $C_1$ at a suitable value with an efficiency equal to optimum efficiency. The energy produced by the expansion of the air in the nozzle $t''$ takes an active part in the propulsion effort.

The result of the preceding disclosure is thus that it is necessary to entirely change the manner of adjusting when the balance speed $v_1$ is passed through and that the nozzle $t''$ and the slide $m$ should not be opened at the same time; there is a lack of continuity when passing from running at a speed $v_1 + \epsilon$ to a speed $v_1 - \epsilon$, $\epsilon$ being a very small amount.

In brief it is possible to summarize the operation as follows:

For operation on a stationary support, $v=0$, the slide $m$ is completely closed and the bypass air is exhausted through the complementary nozzle $t''$;

For $v<v_1$ the cross section of the nozzle $t''$ is gradually adjusted, while the slide $m$ remains entirely closed;

At the moment at which $v$ rises beyond $v_1$, $v=v_1+\epsilon$, the nozzle $t''$ is entirely closed and the slide $m$ is opened wide;

For $v>v_1$ the slide $m$ is progressively closed, the nozzle $t''$ remaining entirely closed.

This manner of operating shows with reference to that described hereinabove according to which the scavenging is adjusted primarily to adaptation conditions for a zero speed of progression, the following advantages and drawbacks.

This adjustment of the scavenging being performed at the speed $v_1$ lower than the normal speed of the aircraft, the gain in efficiency provided by the scavenging is reduced because although the energy of expansion in the nozzle $t''$ takes an active part in the propulsion of the aircraft, it does not increase by reason of the increase in temperature produced in case of mixture with the exhaust gases of the turbine. Consequently, the more the speed at which the sweeping is adjusted is low, the more the gain in efficiency provided by the sweeping is reduced for maximum speed rate.

This second solution of the problem disclosed provides therefore with reference to the former an increase in efficiency at maximum speed rate, but as the energy of the scavenging flux is not increased by any heating for operation on a stationary support, the operation on a stationary support and that at low speeds are less favorable.

It should be noticed that the same conclusion appears when instead of decreasing the speed at constant altitude, the altitude is increased at constant speed. As a matter of fact, the temperature $T_0$ at the section end of the compressor decreases while the temperature streamupwards with reference to the turbine T remains constant so that the efficiency of the thermic cycle increases and consequently the compression power per kilogramme of air is reduced for a same ratio of compression. In order to provide this compression power, the turbine will operate with a smaller expansion ratio and the difference between the pressure of the scavenging air delivered $p_1$ and the pressure $p_2$ at the outlet of the turbine decreases. The solution given out by Fig. 2 should therefore be applied beyond a certain altitude for conveying to the propulsion system the maximum advantages.

In order to secure the various positions of valve system $m$ and streamlined body $j$, we may for instance provide a forked lever $k$ pivotally mounted on either side of the sleeve which constitutes the valve system $m$, pins on said lever engaging slots in said sleeve. Lever $k$ is also pivotally mounted in an eye $l$ on the control rod for body $j$. Finally, body $j$ is biassed to closed position by a spring $o$. By moving the outer end of lever $k$ at $q$, it is possible to bring valve system $m$ in any desired position, while body $j$ is in closed position and $l$ provides a stationary fulcrum by reason of action of spring $o$. When $m$ is at the end of its closing stroke, it provides a stationary fulcrum and any movement of joint $q$ to the left causes compression of spring $o$ with gradual opening of the passage controlled by body $j$.

What we claim is:

1. In aircraft propelling means operating through direct reaction jet and scavenging, the combination of a compressor including a lower pressure and a higher pressure part, said higher pressure part being fed by part of the air from the lower pressure part, the remainder of which forms scavenging air, a combustion chamber at the outlet of the higher pressure part of the compressor, a turbine fed by the gases produced in said chamber, a circuit for the scavenging air produced by the lower pressure part of the compressor, said circuit being in ring formation about the higher pressure part of the compressor and the turbine and opening out at the rear of said turbine, a reaction jet nozzle fed by the turbine and by the circuit, an annular valve system inserted in the circuit for the scavenging air and means controlling the passage allowed for the scavenging air through said valve system.

2. In aircraft propelling means operating through direct reaction jet and scavenging, the combination of a compressor including a lower pressure and a higher pressure part, said higher pressure part being fed by part of the air from the lower pressure part the remainder of which forms scavenging air, a combustion chamber at the outlet of the higher pressure part of the compressor, a turbine fed by the gases produced in said chamber, a circuit for the scavenging air produced by the lower pressure part of the compressor, said circuit being in ring formation about the higher pressure part of the compressor and the turbine and opening out at the rear of said turbine, a reaction jet nozzle fed by the turbine and by the circuit, an annular valve system inserted in the circuit for the scavenging air immediately at the entrance of the reaction jet nozzle and giving the air passing through same the same direction as that of the gases passing out of the turbine; and means controlling the passage allowed for the scavenging air through said valve system.

3. In aircraft propelling means operating through direct reaction jet and scavenging, the combination of a compressor including a lower pressure and a higher pressure part, said higher pressure part being fed by part of the air from the lower pressure part the remainder of which forms scavenging air, a combustion chamber at the outlet of the higher pressure part of the compressor, a turbine fed by the gases produced in said chamber, a circuit for the scavenging air produced by the lower pressure part of the compressor including a conical portion, a reaction jet nozzle fed by the turbine and by the circuit, a cylinder arranged laterally with reference to the turbine inside the conical portion of the scavenging air circuit, and means adapted to control the longitudinal movement of the cylinder inside said conical portion for modifying the cross sectional area for the scavenging air through said conical portion.

4. In aircraft propelling means operating through direct reaction jet and scavenging, the combination of a compressor including a lower pressure and a higher pressure part, said higher pressure part being fed by part of the air from the lower pressure part the remainder of which forms scavenging air, a combustion chamber at the outlet of the higher pressure part of the compressor, a turbine fed by the gases produced in said chamber, a circuit for the scavenging air produced by the lower pressure part of the compressor, a reaction jet nozzle fed by the turbine and by the circuit, a valve system inserted in the circuit for the scavenging air, means controlling the passage allowed for the scavenging air through said valve system, an auxiliary jet nozzle adapted to be fed directly by the scavenging air circuit and means for controlling the amount of air passing from said circuit into said auxiliary nozzle.

5. In aircraft propelling means operating through direct reaction jet and scavenging, the combination of a compressor including a lower pressure and a higher pressure part, said higher pressure part being fed by part of the air from the lower pressure part, the remainder of which forms scavenging air, a combustion chamber at the outlet of the higher pressure part of the compressor, a turbine fed by the gases produced in said chamber, a circuit for the scavenging air produced by the lower pressure part of the compressor including a conical portion, a reaction jet nozzle fed by the turbine and by the circuit, a cylinder arranged laterally with reference to the turbine inside the conical portion of the scavenging air circuit, an auxiliary jet nozzle adapted to be fed directly by the scavenging air circuit, means adapted to close progressively the passage of the scavenging air into said auxiliary nozzle for aircraft speeds rising from zero to a predetermined substantially low value while the cylinder is in its circuit closing position and means for controlling the movable cylinder between the positions corresponding to wide open passage of the scavenging gases and to a predetermined restricting position when aircraft speeds rise beyond said predetermined value.

ROGER JEAN IMBERT.
MARCEL HENRI LOUIS SÉDILLE.

REFERENCES CITED

The following references are of record in the file of this patent:

UNITED STATES PATENTS

| Number | Name | Date |
|---|---|---|
| 2,385,366 | Lysholm | Sept. 25, 1945 |
| 2,396,911 | Anxionnaz et al | Mar. 19, 1946 |